United States Patent
Boutaghou

(10) Patent No.: US 6,843,705 B2
(45) Date of Patent: Jan. 18, 2005

(54) APPARATUS FOR FINISHING A MAGNETIC SLIDER

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 87 days.

(21) Appl. No.: 10/382,300

(22) Filed: Mar. 5, 2003

(65) Prior Publication Data

US 2003/0148715 A1 Aug. 7, 2003

Related U.S. Application Data

(62) Division of application No. 09/901,321, filed on Jul. 9, 2001, now Pat. No. 6,551,173.
(60) Provisional application No. 60/218,262, filed on Jul. 13, 2000.

(51) Int. Cl.[7] .................................................. B24B 1/00
(52) U.S. Cl. ............................. 451/5; 451/28; 451/41; 29/603.16
(58) Field of Search .............................. 451/5–10, 28, 451/41, 54, 285–288; 29/603.12, 603.14, 603.16, 603.18, 603.1; 360/121, 126; 81/302, 424; 248/206.2, 205.5

(56) References Cited

U.S. PATENT DOCUMENTS

| | | | |
|---|---|---|---|
| 4,418,472 A | 12/1983 | Lorenze, Jr. ................. | 29/603 |
| 4,477,968 A | 10/1984 | Kracke et al. ................ | 29/603 |
| 5,267,107 A | 11/1993 | Vadnais et al. ............. | 360/103 |
| 5,722,155 A | 3/1998 | Stover et al. ............... | 29/603.1 |
| 5,755,612 A | 5/1998 | Schaenzer et al. ............. | 451/5 |
| 5,796,551 A | 8/1998 | Samuelson ................... | 360/103 |
| 5,951,371 A | 9/1999 | Hao ............................ | 451/28 |
| 6,027,397 A | 2/2000 | Church et al. ................. | 451/1 |
| 6,045,431 A | 4/2000 | Cheprasov et al. ............ | 451/5 |
| 6,093,083 A | 7/2000 | Lackey ....................... | 451/28 |
| 6,551,173 B2 * | 4/2003 | Boutaghou ................... | 451/28 |
| 6,561,875 B1 * | 5/2003 | Homma et al. ............... | 451/41 |

FOREIGN PATENT DOCUMENTS

| JP | 55135322 | 10/1980 |
|---|---|---|
| JP | 58194164 | 12/1983 |
| JP | 01004906 | 1/1989 |
| JP | 03263604 | 11/1991 |

OTHER PUBLICATIONS

"Reactive Ion Etching", by C. Steinbruchel, *Handbook of Thin Film Process Technology*, pp. C1.1:1–C1.1:23, 1996.

* cited by examiner

Primary Examiner—Lee D. Wilson
(74) Attorney, Agent, or Firm—Westman, Champlin, & Kelly

(57) ABSTRACT

A process for finishing a disc drive slider in which a pressure generator applies multiple pressures to the back surface of one slider while the front surface of the one slider contacts a lapping surface to form a finished front surface of the slider. The slider is part of a substrate having multiple unfinished sliders formed in it. An etch process is used to etch trenches in the substrate aligned between the sliders and to form webs joining the sliders together. After the sliders are finished by lapping, the webs are removed to separate the sliders. The multiple sliders are conveniently held together during the finishing process and the etching process avoids damage to the sliders.

15 Claims, 7 Drawing Sheets

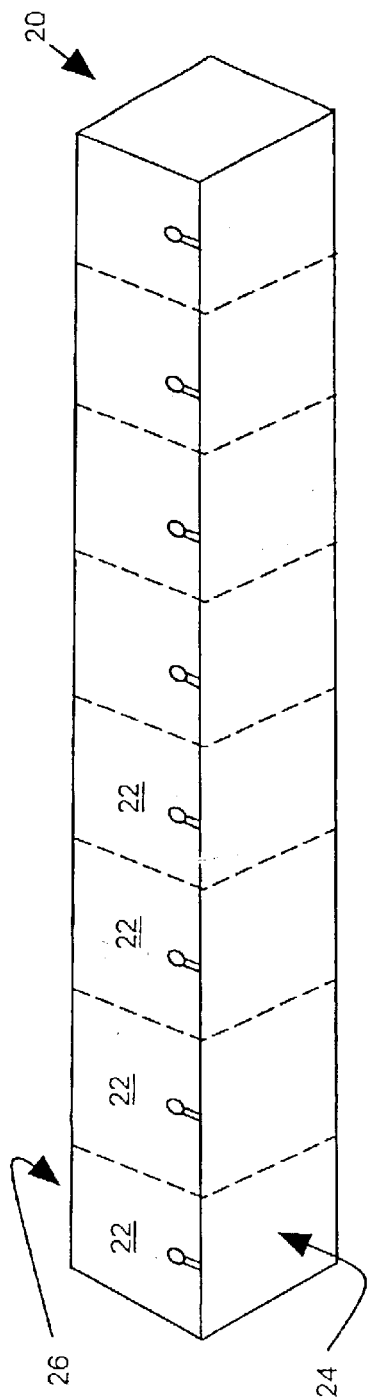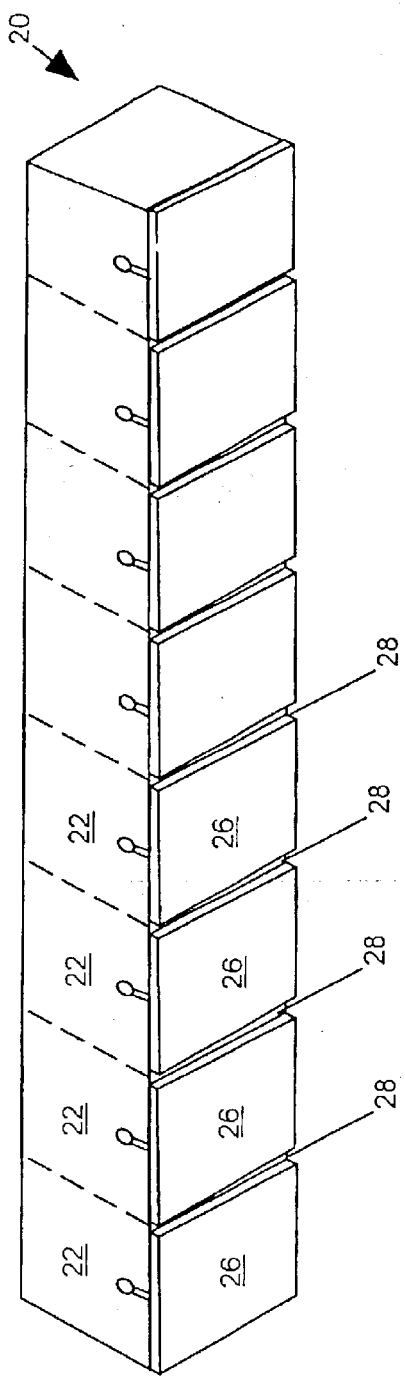
FIG. 2
FIG. 3

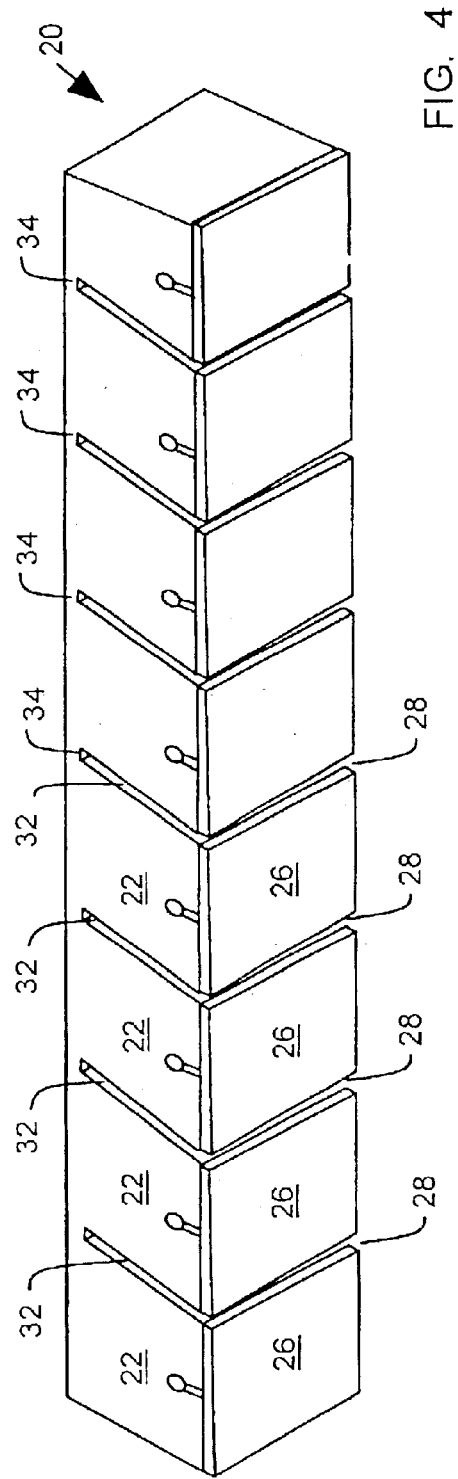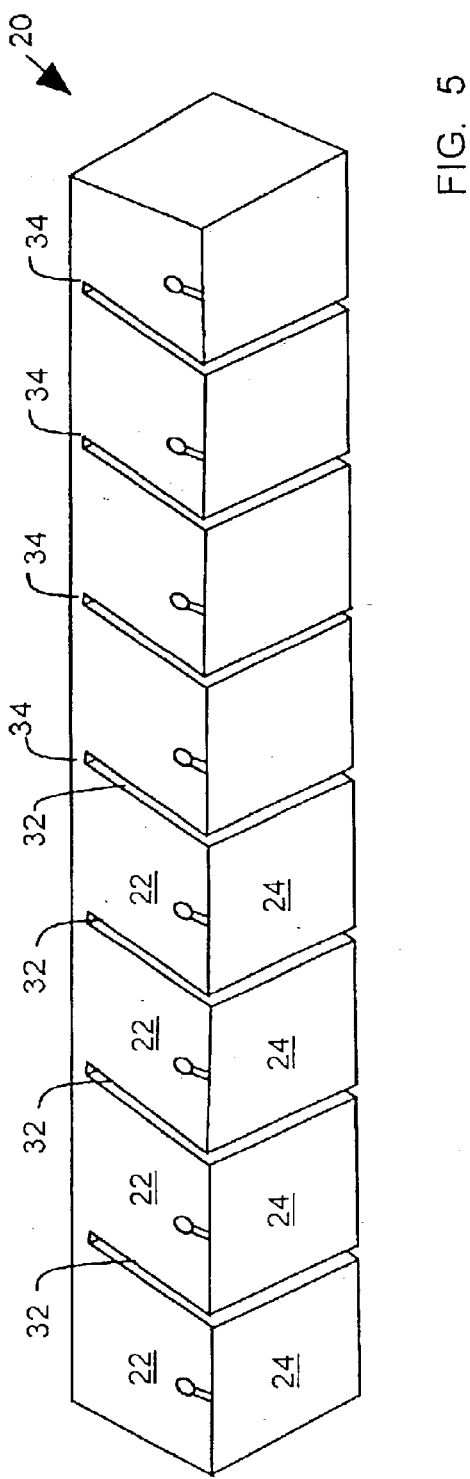

APPARATUS FOR FINISHING A MAGNETIC SLIDER

CROSS-REFERENCE TO RELATED APPLICATION

This is a Divisional of application Ser. No. 09/901,321, filed Jul. 9, 2001 now U.S. Pat. No. 6,557,173 which claims priority benefits from U.S. Provisional Application 60/218, 262 titled "Stripe height control using independent controlled sliders and method to separate sliders from bars with deep reactive etching," filed Jul. 13, 2000.

FIELD OF THE INVENTION

The present invention relates generally to sliders for use in magnetic storage drives. In particular, this invention relates to methods and apparatus for finishing a disc drive slider that include lapping a surface of a disc drive slider.

BACKGROUND OF THE INVENTION

During the fabrication of magnetic heads for use in magnetic data storage applications, an array of transducers and auxiliary circuits are fabricated on a common substrate in a deposition of metallic and non-metallic layers. The array is then cut up into smaller bars, with each bar including a row of multiple read/write heads. The bars are then lapped to adjust an average stripe height (SH) of magnetoresistive (MR) transducers in the bar, the average throat height (TH) of inductive transducer in the bar, or both. The auxiliary circuits in the bars are electrical lap guides (ELGs) that sense the progress of the lapping process. Each electrical lap guide has an electrical resistance that increases as material is removed by lapping. Lapping is stopped automatically when the average stripe height and/or average throat height are within acceptable limits. After the lapping process is complete, the bars are cut up into individual read/write heads or sliders using diamond saws.

The process of lapping a solid bar has a limited ability to adjust only the average stripe height or average throat height for all the sliders formed in the bar. There are remaining undesired variations in individual stripe height or throat height among the sliders in a bar.

As higher recording densities are being introduced, there is a need for better control than this average control, particularly in the case of stripe height. It is, however, inconvenient and expensive to handle individual sliders in a lapping operation because of their small size.

A process and apparatus are needed that can handle bars of substrate with multiple sliders in each bar, while controlling lapping to individually or independently control stripe height for each slider.

SUMMARY OF THE INVENTION

Disclosed is a process and apparatus for finishing a disc drive slider. The slider is part of a substrate bar having multiple unfinished sliders formed in it. An etch process is used to etch stress-isolating trenches in the substrate aligned between the sliders and to form webs joining the sliders together. The apparatus includes a pressure generator that applies multiple pressures to the back surface of one individual slider while the front surface of the one individual slider contacts a lapping surface to form a finished front surface of the slider.

After the sliders are finished by lapping, the webs are removed to separate the sliders. The webs flexibly hold the multiple sliders together in a fixture during the lapping process while allowing the individual sliders to move independently. The pressures applied to each individual slider can be independently controlled, allowing for improved control of the stripe height (SH), the throat height (TH) or both of each sldier. The etching process avoids damage from the use of diamond saws.

BRIEF DESCRIPTION OF THE DRAWINGS

FIG. 2 illustrates an unfinished substrate including multiple unfinished disc drive sliders.

FIG. 3 illustrates an unfinished substrate with a selective masking layer.

FIG. 4 illustrates an unfinished substrate with etched trenches.

FIG. 5 illustrates an unfinished slider with the selective masking layer removed.

DETAILED DESCRIPTION OF ILLUSTRATIVE EMBODIMENTS

In the present invention, a bar of multiple disc drive sliders has trenches etched between individual sliders using etching. The etching is controlled using a selective mask, and the etching is stopped before it completely cuts through the bar, leaving a web that keeps the sliders flexibly joined together for convenient handling during subsequent lapping operations. The use of etching avoids the use of diamond saws which can leave contamination in the form of chips and can also damage the sliders.

A pressure generator applies multiple pressures to the back surface of one individual slider while the front surface of the one individual slider contacts a lapping surface to form a finished front surface of the slider. The lapping can be automatically controlled by feedback from electric lap guides in the one slider being lapped. The slider being lapped is able to respond independently to the pressures applied to it because the trenches provide stress isolation between the individual sliders. The webs flex to allow the slider being lapped to move independently of adjacent sliders.

After the sliders are individually finished by lapping, the webs are removed to separate the sliders, preferably using masking and etching.

Figure 1:
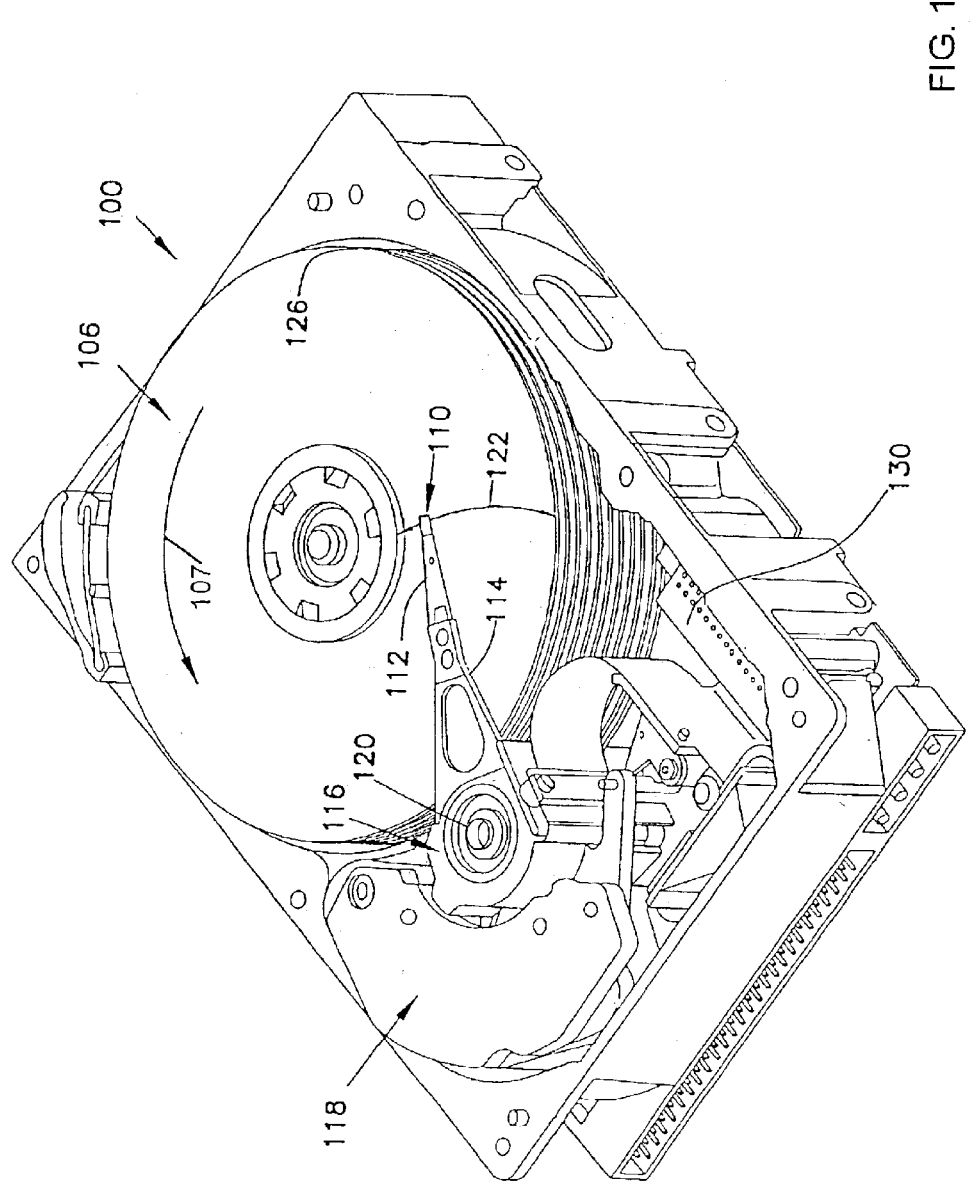
FIG. 1 illustrates an embodiment of a disc drive.

In FIG. 1, an embodiment of a disc drive 100 is illustrated. Disc drive 100 includes a disc pack 126 having storage surfaces 106 that are typically layers of magnetic material. The disc pack 126 includes a stack of multiple discs and the read/write head assembly includes a read/write transducer or slider 110 for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive and transferring data in and out of the disc drive.

FIG. 2 illustrates a substrate 20 in an unfinished condition including multiple unfinished disc drive sliders 22 arranged in a bar shape. Each disc drive slider 22 includes a front surface 24 which is lapped in a subsequent finishing process while pressure or force is applied to a back surface 26 (not visible in FIG. 2) of each slider 22. Each disc drive slider 22 is formed from a slider substrate and various selectively deposited layers of materials that form a read/write head and electrical lap guides(s) in the deposited layers.

FIG. 3 illustrates the substrate 20 with a selective masking layer 26 applied to the front surfaces 24 of the sliders 22. The masking layer 26 is lithographically patterned to define masking grooves 28 which are not covered by the masking layer 26. The masking layer 26 is formed of a material that is resistant to erosion by etching.

FIG. 4 illustrates the substrate 20 after deep trenches 32 have been etched in substrate 20 using a microstructure etching process. Reactive ion etching (RIE), ion beam chemical dry etch, ion milling or other known microstructure etching (micromachining) techniques can be used. Etching processes are known, for example, from Handbook of Thin Film Technology, IOP Publishing Company 1997 (CD-ROM).

The position and size of trenches 32 are defined by the masking grooves 28 and aligned between the individual sliders 22. A directional etching process is preferred in etching trenches 32 in order to accurately reproduce the masking grooves and etch deep trenches 32. The substrate 20 can be formed of a single crystal material such as doped silicon. The etching process is stopped or controlled to etch trenches 32 only partially through the substrate 20, forming webs 34 that join the sliders 22 together. Webs 34 are thick enough to hold the sliders 22 together during a subsequent lapping operation, and thin and flexible enough to allow each slider 22 to mover responsive to pressure somewhat independently of the adjacent sliders 22.

FIG. 5 illustrates the unfinished slider 20 with the selective masking layer 26 removed after the etching process is complete.

Figure 6:
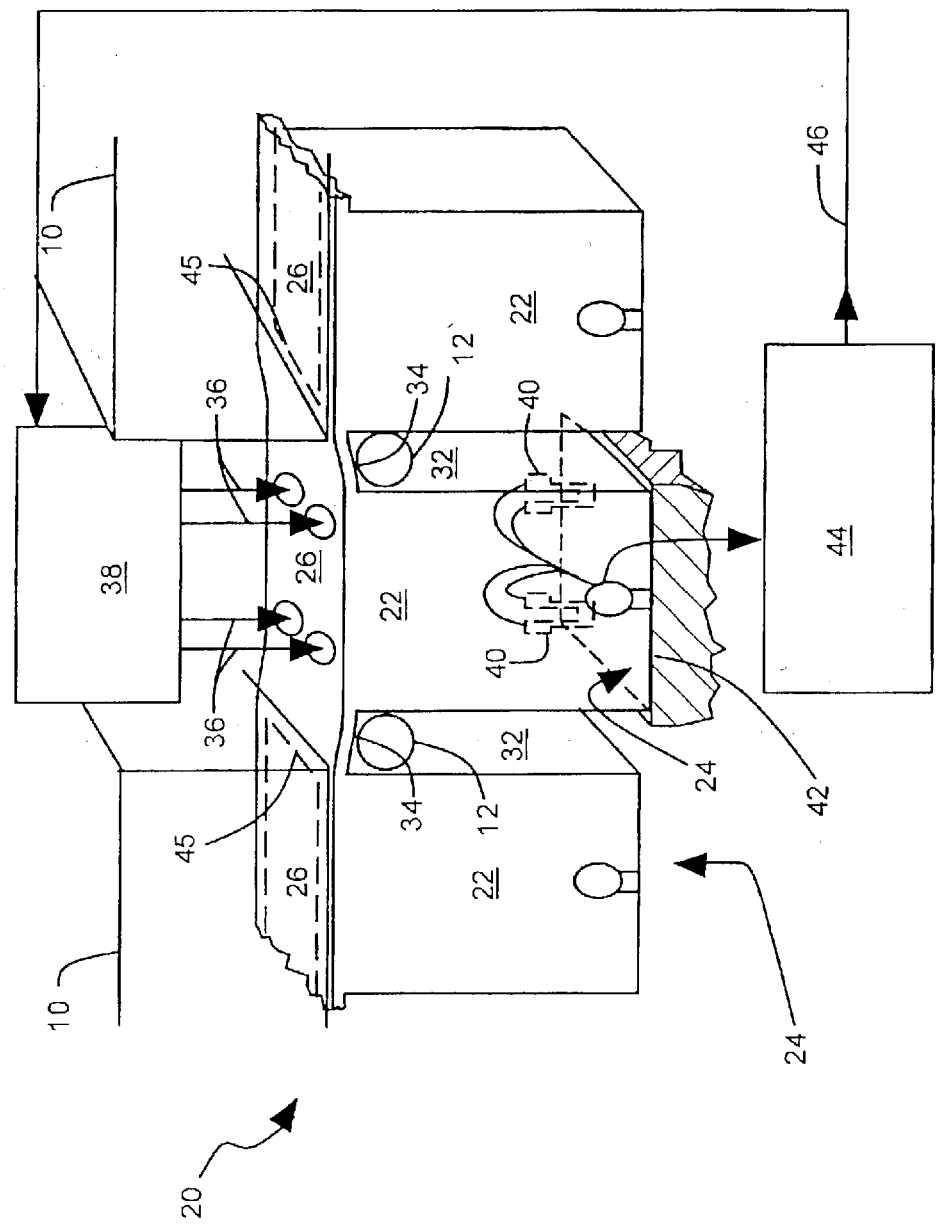
FIG. 6 schematically illustrates an apparatus applying multiple pressures to an unfinished slider during a lapping process.

FIG. 6 schematically illustrates a process of applying multiple pressures 36 to an unfinished slider 22 during a lapping process. In FIG. 6, a portion of the substrate 20 of FIG. 5 is illustrated with the same reference numerals being used in FIG. 6 that are used in FIG. 5. The bar-shaped substrate 20 made up of multiple unfinished sliders 22 joined together by webs 34 is placed between a lapping surface 42 and a multiple pressure generator 38. Multiple pressure generator 38 generates multiple pressures 36 that are applied to the back side 26 of one of the sliders 22 as illustrated. Multiple pressures 36 can be each individually controlled based on electrical feedback 46 from an electrical lap guide controller or circuit 44. Electrical lap guide controller 44 is connected to electrical lap guides (ELGs) 40 that are disposed in the unfinished slider 22 that is being lapped. The front surface 24 of the slider 22 is in contact with lapping surface 42 while controlled pressure is applied to back surface 26. A finished front surface is formed by lapping at front surface 24 based on feedback from the electrical lap guides (ELGs) 40. Feedback from the ELGs 40 controls the approach of the front surface 24 to the lapping surface 42. The individual pressures 36 can be adjusted in real time to change the profile of pressure applied from front-to-back and left-to-right to vary the lapping rate in different regions of the front surface 24. The stripe height (SH), the throat height (TH) or both of each individual slider 22 are precisely controlled using feedback from the electrical lap guides 40. The electrical lap guides 40 are explained in more detail below in connection with FIG. 9.

The multiple sliders 22 can be lapped independently of one another. This can be done sequentially with a single pressure generator 38. While the lapping is going on at one slider 22, the backsides of adjacent sliders 22 can be held by a fixture 10 with openings 45 that subject adjacent sliders 22 to a vacuum to conveniently hold the bar-shaped substrate 20 in place during the lapping operation.

Alternatively, the multiple sliders 22 can be lapped simultaneously using multiple pressure generators 38 and multiple ELG controllers 44. When simultaneous lapping is done, the substrate 20 is held in place by mechanically engaging the webs 34 on an alternate mounting fixture with arms 12 inserted under the webs 34 as illustrated.

The webs 34 hold the sliders 22 together and each trench 32 stress-isolates each slider 22 from an adjacent slider 22 during the lapping. The webs 34 hold the sliders 22 together while the trenches 32 reduce transverse mechanical support of each slider 22 during the lapping.

Figure 7:
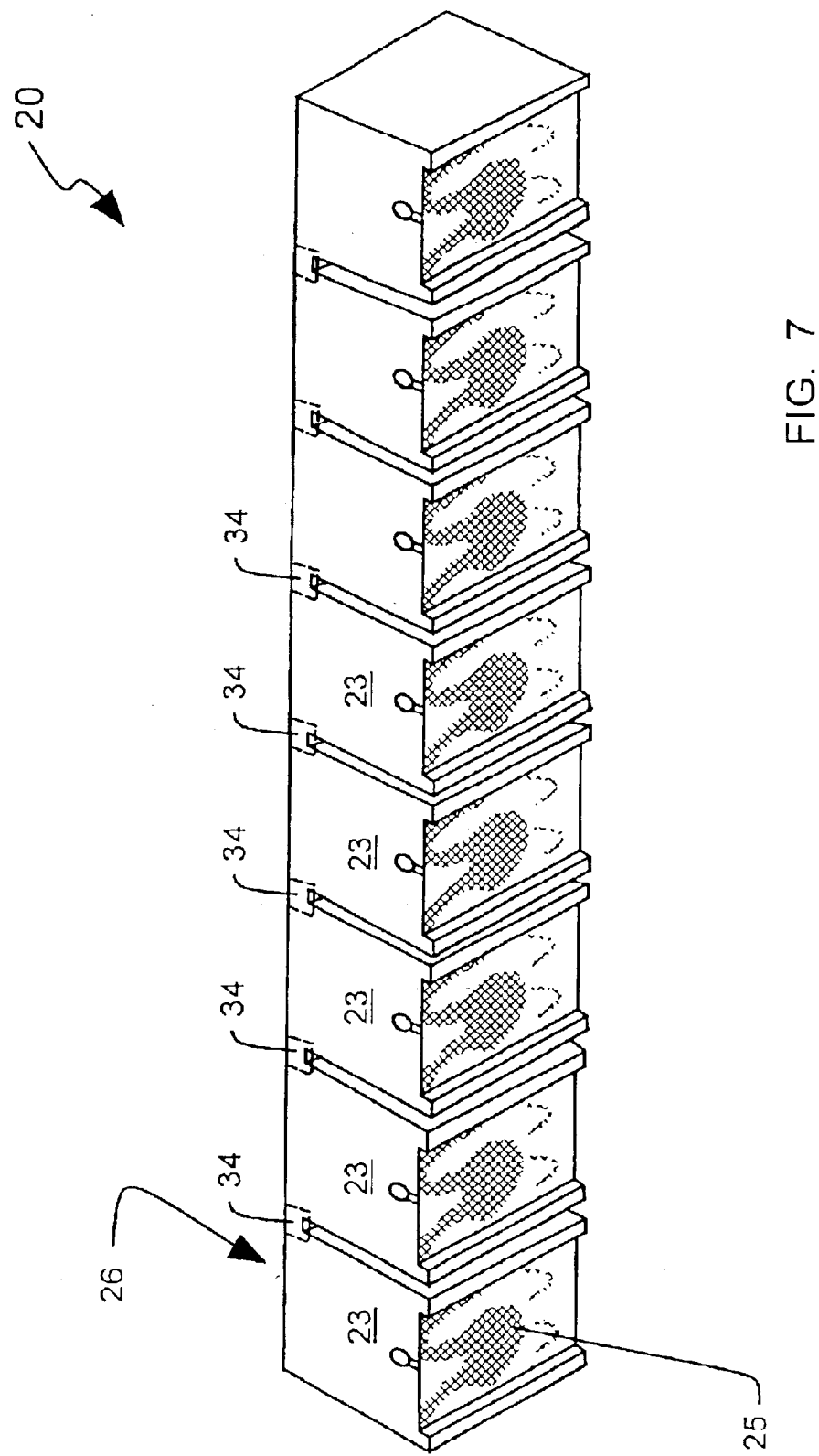
FIG. 7 illustrates a finished substrate including finished sliders.

After each of the sliders 22 in substrate 20 has been through the lapping process illustrated in FIG. 6, a finished substrate 20 as illustrated in FIG. 7 results.

FIG. 7 illustrates a finished substrate 20 including finished sliders 23 that include a finished (lapped) front surface 25. The finishing of the sliders having been completed, the webs 34 are removed. Webs 34 can be removed by etching as illustrated in dashed lines in FIG. 7.

Figure 8:
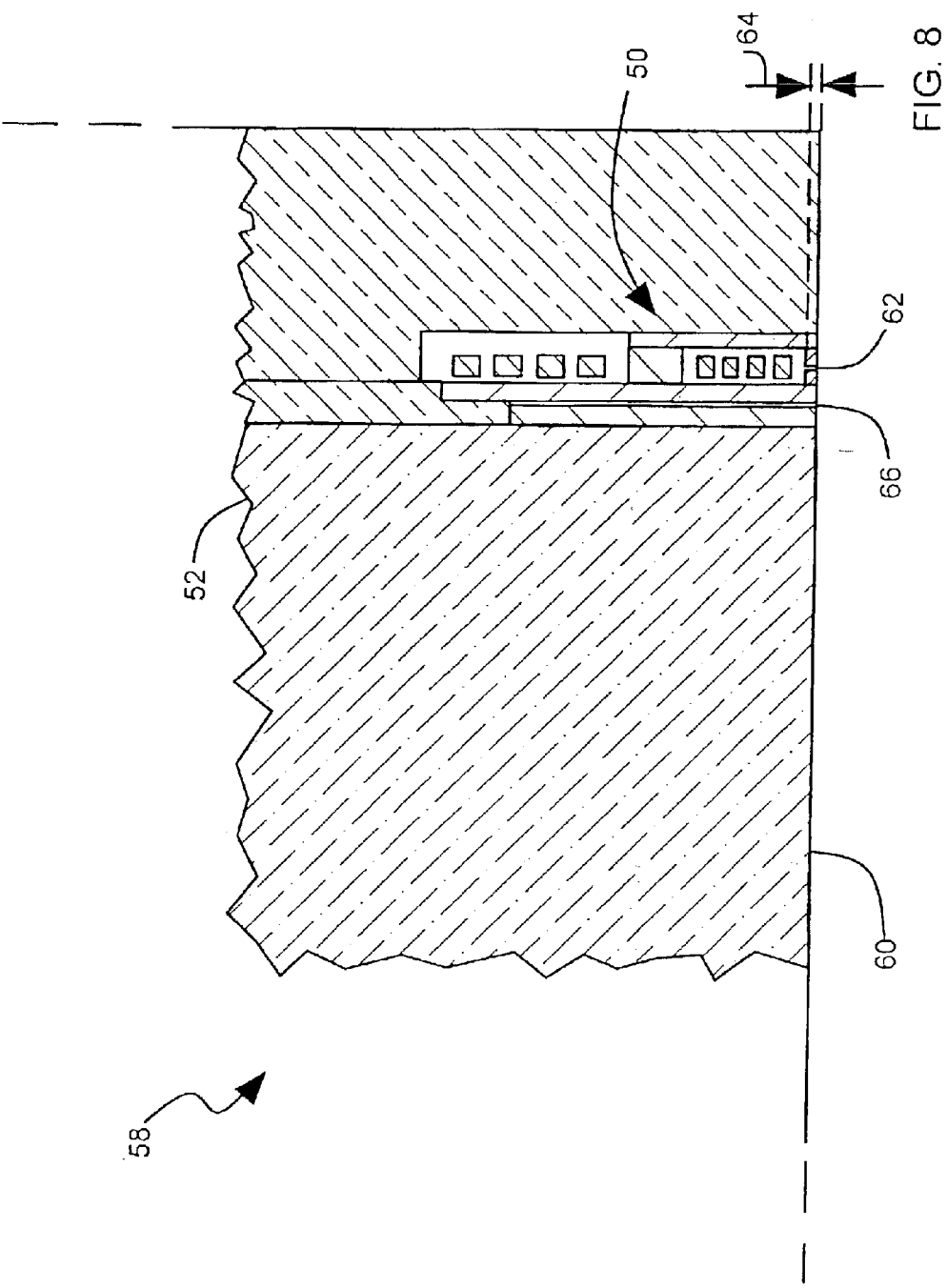
FIG. 8 illustrates a cross sectional view of a slider with an inductive transducer and a layer including a magnetoresistive (MR) transducer.

FIG. 8 illustrates a partial cross sectional view of a slider 58 with an inductive write transducer 50 and a layer 66 including a magnetoresistive (MR) transducer and electrical lap guides (ELGs). The cross sectional view in FIG. 8 is perpendicular to a bottom surface 60 that is part of the lapped surface. The portion of the slider 58 that is illustrated is a portion near the trailing edge of the slider 58. Slider 58 is formed on a substrate 52 in a conventional manner using thin film processing techniques. The inductive transducer 50 includes an inductive transducer throat 62 with a throat height 64. Lapping of surface 60 (as described above in connection with FIG. 6) adjusts the height of the inductive throat 62 and also the height of a magnetoresistor and electrical lap guides in layer 66. The arrangement of the magnetoresistor and electrical lap guides in layer 66 is explained in more detail below in connection with FIG. 9.

Figure 9:
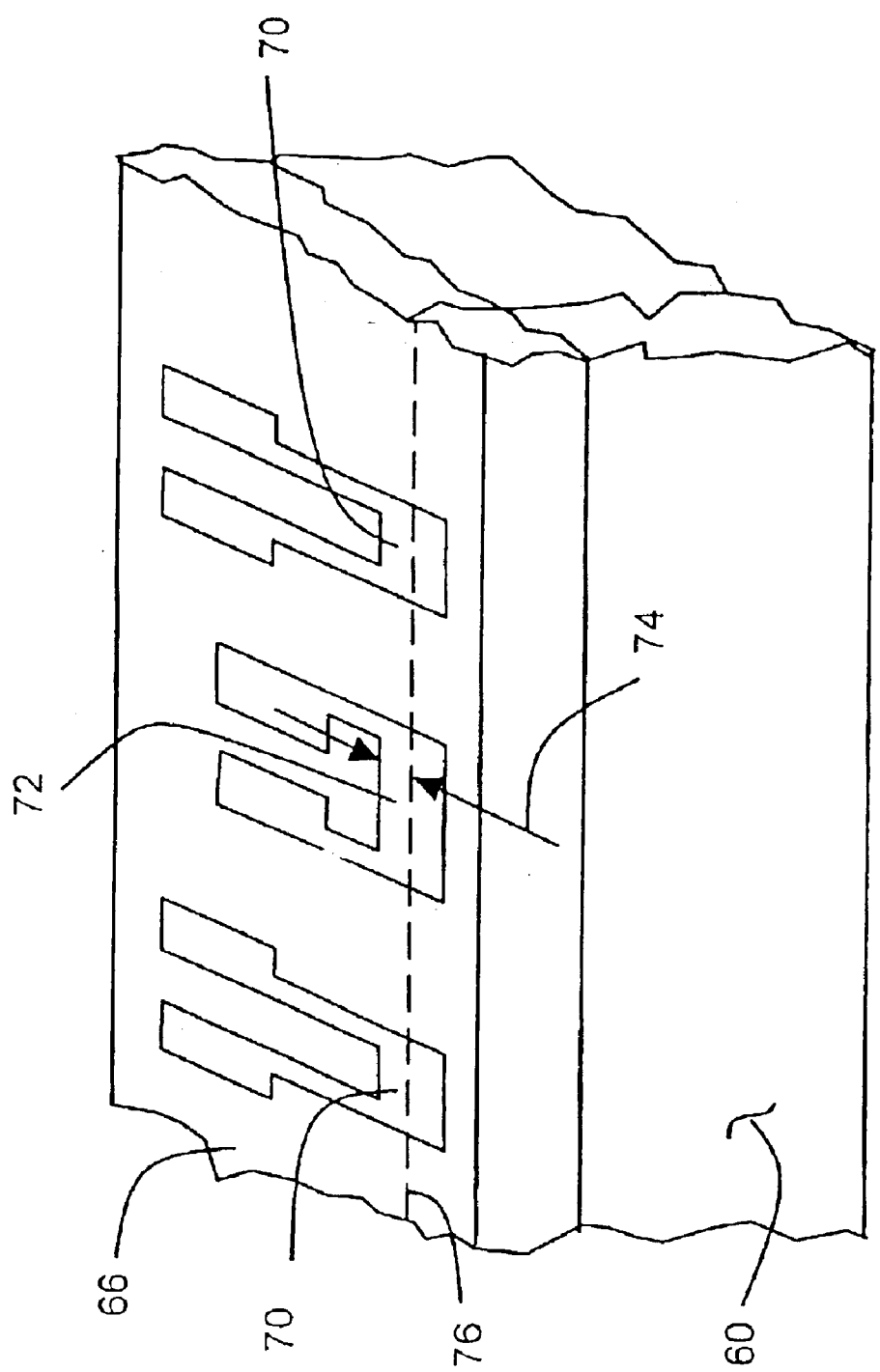
FIG. 9 illustrates a cross sectional view that is transverse to the view shown in FIG. 8 of the layer including a magnetoresistive transducer (MR).

FIG. 9 illustrates a cross sectional view that is transverse to the view shown in FIG. 8 of the layer 66. Layer 66 includes a magnetoresistive transducer (MR) 72 and electrical lap guides 70. As the bottom surface 60 is lapped (as illustrated in FIG. 6), the stripe height 74 of the magnetoresistive transducer 72 changes, and also the electrical resistance of the electrical lap guides 70 changes as they are eroded away by the lapping process. When the desired lap depth is acheived at dotted line 76 as indicated by lap guide resistances, the lapping process is stopped. The stripe height 74 is controlled by the applied pressures during lapping as explained above in connection with FIG. 6. The throat height (TH) 64 is also controlled or adjusted by the applied pressures during lapping.

In summary, a process for finishing a disc drive slider (22,23) is disclosed. A substrate (20) has multiple unfinished sliders (22) formed in it, each slider (22) has a front surface (25) and a back surfaces (26). An etch process is used to etch trenches (32) in the substrate (20), aligned between the sliders (22) and to form webs (34) joining the sliders (22) together. A multiple pressure generator (38) applies pressures (36) to the back surface (26) of one slider (22) while the front surface (24) of the one slider (22) contacts a lapping surface (42) to form a finished front surface (25). The webs (34) are removed to separate the finished disc drive sliders (26).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the masking and etching may vary depending on the particular application for the slider while maintaining substantially the same functionality without departing from the scope and spirit of the present invention. In addition, although the preferred embodiment described herein is directed to a slider for a disc drive, it will be appreciated by those skilled in the art that the teachings of the present invention can be applied to other systems, like tape drive and magneto-optical drives, without departing from the scope and spirit of the present invention.

What is claimed is:

1. An apparatus for finishing a disc drive slider, comprising:

a multiple pressure generator adapted to apply multiple pressures to a back surface of a first disc drive slider that is joined by webs to adjacent disc drive sliders in a disc drive slider substrate;

a holding fixture for restraining the adjacent disc drive sliders;

a lapping surface arranged to lap a front surface of the first disc drive slider; and a feedback circuit providing feedback from electrical lap guides (ELGs) in the first disc drive slider to the multiple pressure generator to control the approach of the front surface to the lapping surface.

2. The apparatus of claim 1 wherein the multiple pressures are individually controlled by the feedback from the electrical lap guides.

3. The apparatus of claim 1 wherein the holding fixture applies a vacuum to the adjacent disc drive sliders.

4. An apparatus for finishing a disc drive slider, comprising:

a holding fixture for holding a disc drive slider substrate including a first disc drive slider in contact with a lapping surface; and means for applying multiple pressures to the back side of the first disc drive slider during lapping, and for controlling the multiple pressures by feedback from electrical lap guides in the first disc drive slider.

5. An apparatus for finishing a component, comprising:

a multiple pressure generator adapted to apply multiple pressures to a back surface of a first component that is joined by webs to adjacent components in a component substrate;

a holding fixture for restraining the adjacent components;

a lapping surface arranged to lap a front surface of the first component; and a feedback circuit providing feedback from electrical lap guides (ELGs) in the first component to the multiple pressure generator to control the approach of the front surface to the lapping surface.

6. The apparatus of claim 5 wherein the feedback circuit is connected to electrical lap guides that are disposed at the front surface.

7. The apparatus of claim 5 wherein the feedback circuit controls a surface shape of a finished front surface based on feedback from the electrical lap guides.

8. The apparatus of claim 5 wherein the multiple pressure generator controls a direction of approach of the front surface to the lapping surface as a function of feedback from the electrical lap guides.

9. The apparatus of claim 5 wherein the multiple pressures are individually adjustable in real time, changing the profile of pressure applied from front-to-back and left-to right to vary the lapping rate in different regions of the front surface.

10. The apparatus of claim 5 wherein the multiple pressure generator controls a stripe height using feedback from the electrical lap guides.

11. The apparatus of claim 5 wherein the multiple pressure generator controls a throat height is controlled using feedback from the electrical lap guides.

12. The apparatus of claim 11 wherein the multiple pressure generator controls a stripe height using feedback from the electrical lap guides.

13. The apparatus of claim 5 wherein the lapping surface laps the first component and adjacent components independently of one another.

14. The apparatus of claim 13 wherein the lapping surface laps first component and adjacent components sequentially.

15. The apparatus of claim 13 wherein the first component and adjacent components are lapped simultaneously by multiple lapping surfaces.

* * * * *